United States Patent [19]

Hinrichs

[11] Patent Number: 5,467,886
[45] Date of Patent: Nov. 21, 1995

[54] LOW BURST PRESSURE, MULTIPLE DOMED, SCORED RUPTURE DISC

[75] Inventor: James O. Hinrichs, Odessa, Mo.

[73] Assignee: Fike Corporation, Blue Springs, Mo.

[21] Appl. No.: 337,866

[22] Filed: Nov. 14, 1994

[51] Int. Cl.$^6$ .................................................. B65D 25/00
[52] U.S. Cl. ...................................... 220/89.2; 137/68.26
[58] Field of Search ........................ 220/89.2; 137/68.1, 137/68.25, 68.26

[56] References Cited

U.S. PATENT DOCUMENTS

| | | | |
|---|---|---|---|
| 2,922,544 | 1/1960 | Hibbard et al. | 220/89.2 |
| 4,580,691 | 4/1986 | Hansen | 137/68.26 |

Primary Examiner—Stephen P. Garbe
Assistant Examiner—Robin A. Hylton
Attorney, Agent, or Firm—Hovey, Williams, Timmons & Collins

[57] ABSTRACT

A multiple-domed, scored rupture disc (28) having a non-apertured disc body (62) provided with separate, side-by-side, semi-circular concavo-convex bulges (76) and an arcuate line of weakness (68) circumscribing the bulges is provided with a diametrical ridge (74) extending across and serving as a divider between the bulged areas of the disc body. The distance between the outer margin of the ridge and a plane through the annular planar section of the disc body is from about 0.3% to about 3% of the diameter of the bulged area to increase the rigidity of the divider ridge. The greater rigidity of the divider ridge decreases the burst pressure of the disc.

16 Claims, 2 Drawing Sheets

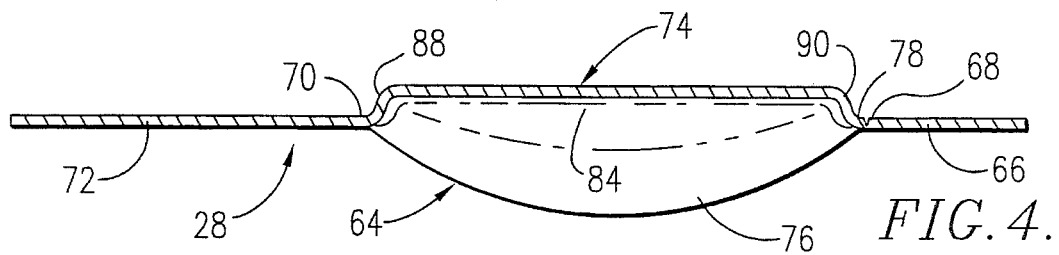
FIG. 4.
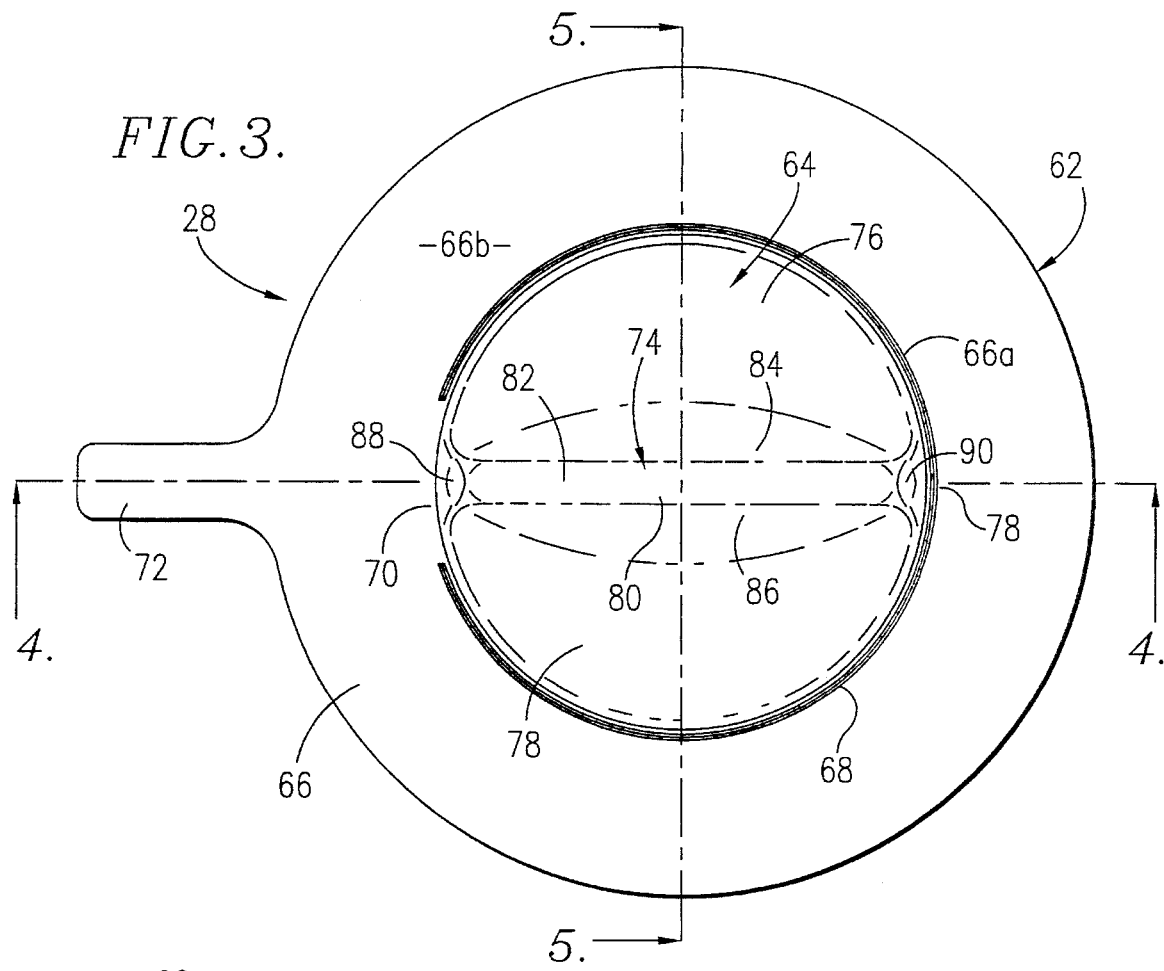
FIG. 3.
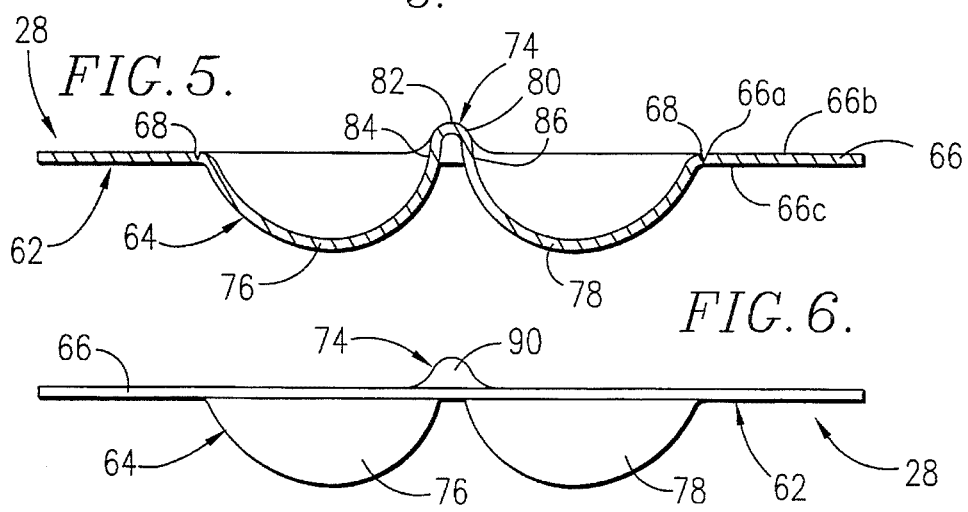
FIG. 5.
FIG. 6.

5,467,886

LOW BURST PRESSURE, MULTIPLE DOMED, SCORED RUPTURE DISC

BACKGROUND OF THE INVENTION

1. Field of the Invention

The present invention relates generally to pressure relief systems and, more particularly, to a rupture disc assembly for use in relieving excess pressure in low-pressure processing applications where it is desirable that sanitary conditions be maintained. It is especially useful in dairy, brewery, food processing and similar sanitary applications where frequent disassembly, cleaning and reassembly of the rupture disc assembly is required.

2. Description of the Prior Art

As explained in U.S. Pat. No. 5,267,666, entitled Multiple-Dome, Scored, Rupture Disc, owned by the assignee hereof (herein the '666 patent), and which is incorporated herein by specific reference thereto, rupture disc assemblies have long been used to relieve pressure in industrial applications for venting excess pressure within pressurized components or equipment in order to prevent damage to the equipment.

In the '666 patent, it is pointed out that conventional forward-acting rupture discs include a unitary disc having a circular central dome region and an outer annular flange. The dome presents a concavo-convex shape corresponding to the size of the relief passage within which the disc is positioned, and the disc is oriented with the concave surface of the dome in contact with the pressure to be relieved. A line of weakness is provided in the disc which substantially circumscribes the dome except for a small hinge portion of the circumference of the central dome region.

Conventional forward-acting discs typically are operated only at pressures up to 80% of that at which the disc is designed to burst in order to preclude premature rupturing. For this reason, reverse-acting rupture disc assemblies having knife blade components are frequently used because they can handle normal operating pressures up to about 90% of the rated pressure of the disc.

The invention of the '666 patent represented an important step forward in the art by elimination of the need for complex knife structure, including the size, location within the assembly, and operation of the knife. This desired result was accomplished through the provision of a pair of semi-circular, side-by-side bulges within the central region of the disc, which were separated by a diametrically extending ridge. Knife blade rupture disc assemblies do not lend themselves though to applications where frequent disassembly of the unit is required in order to maintain required sanitary conditions.

In the knife-less multiple dome rupture disc of the '666 patent, the diametrical ridge dividing the central region of the disc into two separate bulges, functioned as a beam to cause the bulged region of the disc to first separate from the planar annular disc section, before separating from the remainder of the planar disc section. The result was positive operation of the disc at a relatively low differential pressure at levels equal to at least about 90% of the burst rating of the disc.

The reverse-acting rupture discs which employed knives, however, did not lend themselves to use in sanitary applications such as dairy product processing operations because of the difficulty in disassembling the knife blade rupture disc assemblies, and to carry out a cleansing operation, particularly on a very frequent basis as required in sanitary equipment requirements.

Even though the multiple-dome, scored, rupture disc of the '666 patent did offer potential advantages in sanitary applications as a replacement or substitute for knife-operated disc assemblies, it was found to be difficult to manufacture multiple-dome discs which offered positive rupture characteristics at relatively low pressures, i.e., 30 psig or even lower in the case of a disc having a rupture area diameter of the order of 1¼ to 1½ inches. Lower than expected burst pressures can also be obtained with larger diameter discs.

OBJECTS AND SUMMARY OF THE INVENTION

It is therefore an object of the present invention to provide an improved multiple-dome, scored, reverse-acting rupture disc which retains the desirable properties of the '666 patent disc, particularly for sanitary applications, but which will burst at a lower differential pressure than the prior multiple-dome disc, while at the same time permitting expeditious removal and cleansing on a frequent basis, without sacrifice in the burst characteristics of the disc.

A lower effective burst pressure accompanied by operability at typical operating pressures approaching the rated burst pressure (90% or better) of the disc was accomplished without any significant increase in the material cost of the disc or the process of fabricating the discs. It was unexpectedly discovered that by increasing the height of the diametrical ridge between adjacent bulges to an extent that the outermost margin of the ridge is spaced from a plane through the annular flat section of the disc a distance of from about 0.3% to about 3% of the diameter of the bulged region of the disc, two important results were obtained.

First, a lower effective burst pressure was obtained as compared with the '666 patent disc when all other factors were maintained the same including material composition, metal thickness, size, extent and depth of scoring, and configuration of the bulges. Extension of the bulge defining ridge in a direction toward the downstream side of the disc when mounted in its normal operating position causes the ridge to have outwardly directed end wall structures presenting an end wall segment at each end of the divider ridge. These end wall segments substantially increase the structural rigidity of the ridge which in turn causes the ridge to be more effective in transferring forces exceeding the design rupture pressure to the surrounding score line to cause rupture of the disc. It has been found through extensive testing that a disc with an extended bulge dividing ridge which in turn defines angular end wall end segments adjacent the score line of the disc unexpectedly lowers the burst pressure of a particular disc over a disc without the extended ridge construction.

Second, it has been found that a disc with an extended bulge dividing ridge can be subjected to a significantly higher number of operating pressure cycles approaching the burst pressure without change in the rated burst pressure.

BRIEF DESCRIPTION OF THE DRAWINGS

A preferred embodiment of the present invention is described in detail below with reference to the attached drawing figures, wherein:

FIG. 3 is an enlarged plan view of a rupture disc embodying the preferred concepts of the present invention;

FIGS. 4 anti 5 are cross sectional views taken along the lines 4—4 and 5—5 respectively of FIG. 3; and FIG. 6 is a side elevational view of the rupture disc as depicted in FIG. 3.

DETAILED DESCRIPTION OF THE PREFERRED EMBODIMENTS

Figure 1:
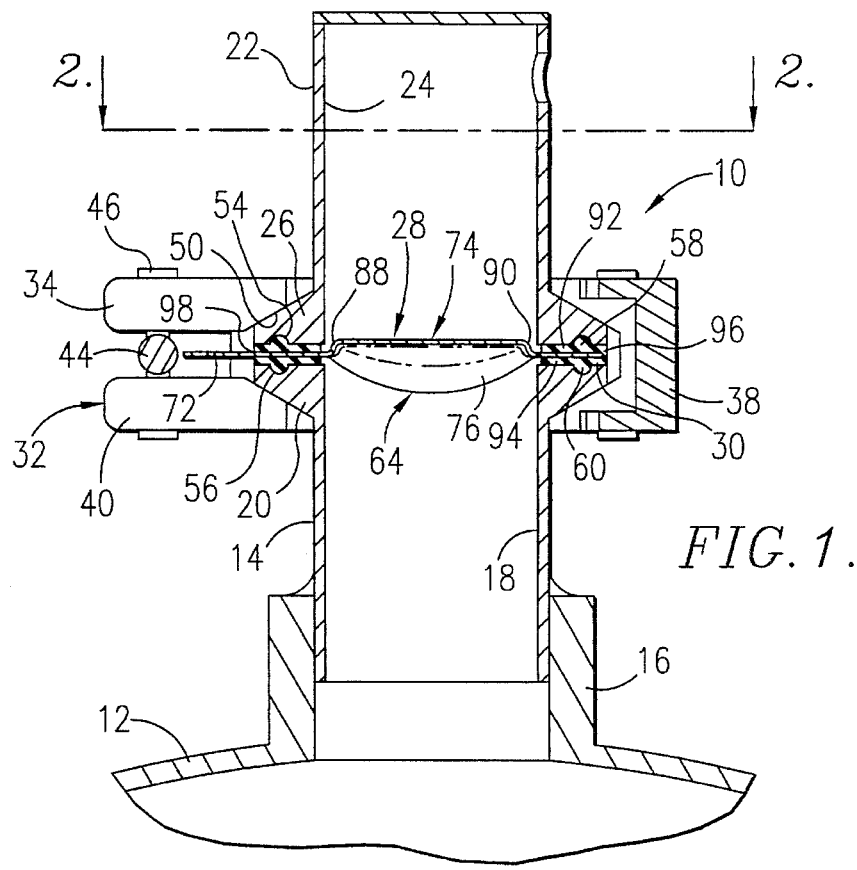
FIG. 1 is a vertical cross sectional view of a rupture disc assembly especially useful for protecting a pressurized system requiring sanitary conditions and illustrating an exemplary pressure vessel, a fixed tubular vent member communicating with the vessel, a removable tubular vent member carried by the fixed vent, a rupture disc and gasket therefore normally blocking the vent passage, and an easily removable and replaceable manually manipulable clamp assembly for securing the disc in its operative position across the vent passage.

The rupture disc assembly 10 as illustrated in FIG. 1 is especially useful for protecting a low pressure system which, for example, in the dairy, brewery or food processing industries must be operated and maintained under sanitary conditions. Assembly 10 is shown as being mounted on a pressure vessel 12. However, it is to be understood that the pressure system requiring protection may be in the form of a pressurized conduit (not shown), or other system component.

In FIG. 1 a fixed tubular vent member 14 is attached to the orifice defining extension 16 communicating with the interior of vessel 12. Vent 14 defines a vent passage 18 and is provided with a circumscribing outermost, circular flange 20. A tubular vent member 22 is removably affixed to vent member 14, and has a an exhaust passage 24 of essentially the same diameter as passage 18 defined by fixed vent member 14. The circular, circumscribing, outwardly directed flange 26 of removable vent member 22 is configured to complementally mate with flange 20 of fixed vent member 14.

The rupture disc 28 positioned between flanges 20 and 26 in blocking relationship to passage 18 is provided with an annular, one-piece, replaceable gasket 30 which engages opposed surfaces of flanges 20 and 26.

Quick release clamp structure 32 is provided for releasably maintaining removable vent member 22 in position on fixed vent member 14 to retain rupture disc 28 in sealing, blocking relationship to vent passage 18. Although clamp structure 32 may take many forms, one useful construction includes a pair of semi-circular arms 34 and 36 having a hinge 38 interconnected adjacent ends of the arms. Outturned arm projections 40 and 42 integral with the ends of arms 34 and 36 respectively which are remote from hinge 38, are configured to be in parallel, spaced relationship when the clamp is closed as depicted in FIG. 2.

A threaded element 44 carried on projection 40 through means of pin 46 is adapted to be received within a slot (not shown) of projection 42. Manually manipulable thumb nut 48 threads onto element 44.

Figure 2:
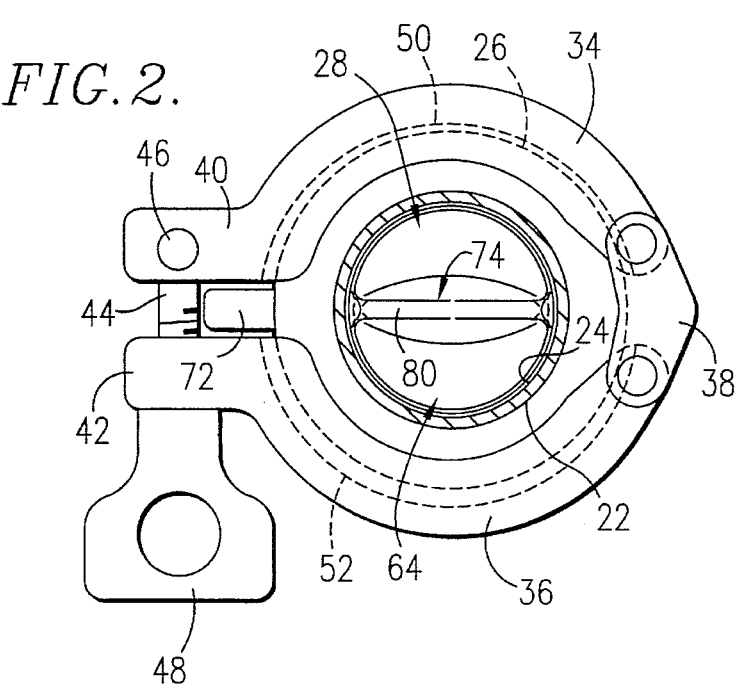
FIG. 2 is a horizontal cross sectional view taken substantially on the line 2—2 of FIG. 1 and looking down in the direction of the arrows.

As best shown in FIGS. 1 and 2, the arcuate arm 34 has respective semi-circular, transversely V-shaped grooves 50 and 52 therein of a configuration to complementally engage the converging, inclined outer surfaces of flanges 20 and 26. As arms 34 and 36 are forced toward one another during tightening of the thumb nut 48, the inclined surfaces of grooves of 50 and 52 engaging the beveled faces of flanges 26 and 20 forces vent member 22 toward the fixed vent member 14. Aligned annular grooves 54 and 56 in the flanges 20 and 26 respectively are adapted to receive respective rib portions 58 and 60 of gasket 30.

The rupture disc 28 includes an essentially flat, non-apertured disc body 62 provided with a generally circular central region 64 surrounded by an outer relatively flat annular section 66. The inner edge 66a of flat annular section 66 is joined to and is integral with central region 64.

Section 66 has opposed annular flat faces 66b and 66c respectively. Face 66b of annular section 66 of disc body 62 has a line of weakness therein defined by semi-circular score line in the nature of a groove 68 located in proximal relationship to annular edge 66a of section 66. The depth of score line 68 may vary around the circumference thereof as explained in the '666 patent, which detailed explanation is incorporated herein by specific reference thereto. The arcuate line of weakness defined by groove 68 circumscribes the central region 64 except for a portion of the circumference of the central region presented by a hinge portion 70 of section 66. The annular section 66 includes a radially extending tab 72 aligned with the hinge portion 70 for guiding placement of the disc within the clamp structure 32 during installation of rupture disc 28 and associated gasket 30.

The central region 64 of the disc body 62 is bisected by a diametrical bar or ridge 74 into two side-by-side semi-circular concavo-convex halves within which the disc is bulged to form two separate concavo-convex bulges or domes 76 and 78 extending in the same direction away from the annular section 66 of body 62. It is to be observed from FIG. 1 that the bulges 76 and 78 project from the disc body 28 in an upstream direction while the ridge 74 extends in a downstream direction from a plane through face 66b of the disc. The bulges 76 and 78 cover substantially the entire central region 64 apart from the ridge 74, and define similar shaped concavities and convexities on opposite sides of body 62. Although not shown in the drawing, it is possible to further divide each semi-circular half of the central region 64 into smaller fractions and to provide separate concavo-convex bulges in each fractional area so that more than two bulges are provided.

For example, the central region may be bisected by a diametrical line which is perpendicular to the ridge so that the central region is divided into quarters. A separate concavo-convex bulge may be formed in each quarter area so that four bulges are formed in the disc body. Any other suitable number of bulges may be provided in a similar manner.

As shown in FIG. 3, the diametrical ridge 74 extends between the hinge 70 and a point 78 diametrically opposed to the hinge relative to the central region 64. Thus, one end of the ridge 74 is centrally located with respect to the hinge and the opposite end of the ridge intersects the line of weakness at the point 78 directly opposite the hinge portion 70.

As best shown in FIGS. 3–5, the elongated ridge 74 has an outermost, longitudinally extending, transversely arcuate wall portion 80 which defines an outer margin 82 that is integral with opposed, elongated, side wall portions 84 and 86 of the ridge. A plane through each side wall portion 84 and 86 longitudinally thereof is at an angle of from about 90° to about 30° to a plane through the face 66b of annular section 66 of disc body 62. In the preferred construction, as for example the configuration depicted in FIG. 5, the angle of each plane through wall portions 84 and 86 is at an angle approaching 90° with respect to a plane through face 66b of disc body 62.

It is also to be seen from FIG. 4 that the side wall portions 84 and 86 and associated outer wall portion 80 defining ridge 74 extend the full diameter of central region 64 between hinge portions 70 and point 78 and terminate in end segments 88 and 90 at opposed ends of the ridge 74. Each of the end segments is at an angle relative to the adjacent face 66b of annular section 66 of about such that the end segments are each at an angle of about 30° to about 90° relative to a plane through face 66b of annular disc section 66. An angularity approaching at least about 90° is preferred.

Viewing FIGS. 1 and 2, it can be seen that the elongated ridge 74 extends substantially the full diameter of passage 24 within segments 88 and 90 being located in proximal relationship to the internal wall surface of vent member 22. In a preferred embodiment, the effective distance between each end segment 88 and the adjacent internal wall surface of vent member 22 defining passage 24 is maintained at a minimum value of no more than about 0.001 inch. It is desirable that the longitudinal length of ridge 74 be maintained at a value between about 70% and 97% of the diameter of passage 24. In all instances, the minimum distance between each end segment 88 and 90 and the adjacent internal wall surface of passage 24 is a function of the diameter of passage 24 and thereby central region 64 of disc body 62, and the thickness of the material used for fabrication of the rupture disc 28. The thickness of the material used to fabricate rupture disc 28 increases as the diameter of passage 24 increases. Accordingly, the spacing between respective end segments 88 and 90 and the adjacent wall surface of vent member 22 increases proportionally as the diameter of passage 24 becomes greater.

A disc 28 adapted for use in association with a tubular vent member 22 having a passage diameter 24 of about 1.5 inches, typically will be of stainless steel which is about 0.004 inch in thickness. 304 and 316 stainless steels are preferred materials for manufacture of disc 28. Other alternate materials include metals such as tantalum, Hastoloy, Inconel, Monel, nickel and gold or silver plated stainless steel. The upstream face of disc 28 may also be Teflon coated, or lined with a corrosion resistant film such as Teflon. A disc 28 sized for a vent passage 2 inches in diameter will typically be of a material having a thickness of about 0.006 inch. Greater passage diameters require the utilization of thicker metal. A disc for use in a vent member 22 having an internal diameter of 4 inches would therefore typically be manufactured of metal material having a thickness of about 0.006 inch.

Gasket 30 preferably is of one piece construction, formed of a resilient material such as rubber, and provided with two flat opposed planar sections 92 and 94 joined to an outer peripheral section 96. Outwardly projecting, circular ribs 58 and 60 integral with the outer faces of planar sections 92 and 94 are adapted to be received within the grooves 54 and 56 in flanges 26 and 20 respectively of members 14 and 22. The peripheral section 96 has a slot 98 for clearing tab 72 of disc 28.

In the operation of rupture disc assembly 10, gasket 30 is placed over the periphery of rupture disc 28 with the annular section 66 of the disc received within the groove presented between planar sections 92 and 94 of the gasket, and with the tabs 72 projecting through the slot 98 in peripheral section 96 of the gasket.

The assembly made up of rupture disc 28 with gasket 30 overlying a peripheral portion of annular section 66 of the rupture disc 28 is placed in position on fixed vent member 14. Removable vent member 22 is then placed over fixed vent member 14 in disposition such that the rib 58 of gasket 30 complementally fits within the groove 54 formed in the downwardly facing surface of flange 26.

The arms 34 and 36 of clamp member 32 are then opened by first loosening thumb nut 48 to allow threaded element 44 to be swung clockwise viewing FIG. 2 so that the arms 34 and 36 may be separated. Arms 34 and 36 are placed in embracing relationship to aligned flanges 20 and 26, and after swinging of threaded element 44 into the position thereof illustrated in FIG. 2, thumb nut 48 is tightened down to force arms 34 and 36 toward each other and thereby tightly clamp flanges 20 and 26 in sealing engagement with gasket 30. Disc 28 is positioned such that the bulges 76 extend toward the downstream side of the pressurized system, while the ridge 74 projects in the opposite direction toward to the upstream passage of vent member 22.

The thickness of the metal material chosen for fabrication of rupture disc 28 is correlated with the depth of the score line 68 in planar section 66 of disc 28. Burst pressures as low as about 30 psig may be obtained by proper correlation of metal type, material thickness and score line depth.

Fabrication of disc 28 of a configuration as depicted and where the distance measured perpendicularly between the outer margin 82 of the ridge 74 and a plane through the face 66b of annular section 66 of disc 28 is from about 0.3% to about 3% of the diameter of central region 64 of the disc, allows metal material to be used of a thickness that can be correlated with the depth of score line 66 in a manner such that a system protected by rupture disc 28 may be operated at a pressure at least as high as 90% of the burst pressure of the disc.

The manufacturing parameters for disc 28 including materials, processing steps, and depth and configuration of the line of weakness 68 may be the same as those explained in the '666 patent which are incorporated herein by reference thereto.

Although the distance from the outer margin 82 to a plane through face 66b of annular section 66 of disc 28 measured perpendicularly to such plane may vary as indicated from about 0.3% to about 3% of the diameter of central region 64 of rupture disc 28, better results are obtained when such distance are maintained at a value of from about 0.75% to about 1.5% of the diameter of central region 64, with best results being obtained when such value is within about i to 1¼% of the diameter of region In an exemplary instance where the internal diameter of vent passage 24 is 1.360, a rupture disc 28 may have an overall diameter (without considering tab 72) of about 1.5 inches. Under these conditions, the diameter of central region 64 of the disc 28 would be about 1.310 inches, and the diameter of the score line 68 would be about 1.350 inches.

The ridge 74 hereof, although performing a function similar to ridge 62 of the '666 patent, has been found to exhibit unexpectedly improved results thereover by virtue of downstream extension of ridge 74 beyond the plane of face 66b to the extent indicated. Extension of the ridge 74 in a downstream direction causes end segments to be formed at opposed extremities of the ridge 74. These end segments at opposite ends of the ridge 74 increase the rigidity of the ridge, particularly where the ridge ends approach the internal side wall of the vent tube. Forces exerted against the convex bulge surfaces of the rupture disc are thereby more effectively transferred to the adjacent score bearing portion of the surrounding annular disc section to cause rupture of the disc if the pressure exceeds an established burst pressure for a particular disc.

A disc 28 having a ridge 74 as described herein, and formed of the same metal material, thickness, dimensions and score line parameters of a disc as shown and described in the '666 patent, has been found to exhibit a burst pressure no greater than 30 psig as compared with a burst pressure of at least 50 psig for the '666 patent disc.

This improved and unexpected result is believed to be attributable to the greater rigidity of the ridge 74, and especially to the end segments 88 of the ridge.

Although the margin 82 of ridge 74 is preferably of longitudinally linear configuration, the margin may be of curvalinear shape longitudinally thereof if desired.

Furthermore, the cycle life of disc 28 has been found to be unexpectedly greater than the '666 patent disc. A series of 1.3 inch discs as described and shown herein were found to have an average minimum cycle life (repeatedly cycled from ambient to 90% of burst pressure) of about 5200 cycles to a maximum of 9400 cycles, whereas similarly sized discs of the '666 patent had an average minimum cycle life of no more than about 1000 and a maximum cycle life of 2500.

In addition, disc 28 as illustrated and described herein were found to unexpectedly exhibit a better damage ratio than '666 patent discs of the same parameters. Damage ratio in this context means that a damaged disc (i.e., a disc with dents in the bulged areas) exhibits closer adherence to the burst pressure of an undamaged disc.

I claim:

1. In a multiple-dome, scored rupture disc having a non-apertured disc body provided with a generally circular, central region, an outer relatively flat annular section having an inner edge surrounding and joined to the central region, and an arcuate line of weakness in the annular section in generally circumscribing relationship to the central region except for a non-scored hinge portion, and wherein the central region is divided into separate, side-by-side, semi-circular, concavo-convex bulges extending outwardly in one direction from the annular section of the body, the improvement comprising:

a diametrical ridge extending across the central region of the disc body between opposed portions of the inner edge of the annular section thereof and dividing the central region into said separate bulges, said diametrical ridge having an outer margin spaced outwardly from a plane through the adjacent face of the annular section of the disc body in a direction opposite said one direction and presenting upright end segments at each end of the ridge, the distance between said outer margin of the ridge and said plane through the annular section of the disc body in a direction perpendicular to said plane being from about 0.3% to about 3% of the diameter of said central region of the body.

2. In a rupture disc as set forth in claim 1, wherein the distance between said outer margin of the ridge and said plane through the annular section of the disc body in a direction perpendicular to said plane being from about 0.75% to about 1.5% of the diameter of said central region of the body.

3. In a rupture disc as set forth in claim 1, wherein the distance between said outer margin of the ridge and said plane through the annular section of the disc body in a direction perpendicular to said plane being from about 1% to about 1.25% of the diameter of said central region of the body.

4. In a rupture disc as set forth in claim 1, wherein the diametrical ridge extends between the hinge portion and a point diametrically opposed thereto.

5. In a rupture disc as set forth in claim 1, wherein said diametrical ridge has end segments at opposed ends thereof extending from the outer margin of the ridge to the adjacent portion of the annular section, each of said segments being at an angle relative to the adjacent face of the annular section of the disc body of about 30° to about 90°.

6. In a rupture disc as set forth in claim 1, wherein said outer margin of the diametrical ridge is essentially linear in configuration.

7. In a rupture disc as set forth in claim 1, wherein said diametrical ridge is defined by wall structure presenting two elongated side wall portions which merge with an outer wall portion defining said outer margin of the ridge, a plane through each side wall portion longitudinally thereof being at an angle of from about 90° to about 30° to said plane through the adjacent face of the annular section of the disc body.

8. In a rupture disc as set forth in claim 1, wherein said outer wall portion is generally arcuate in transverse cross section.

9. In a rupture disc as set forth in claim 1, wherein said disc body is fabricated of a corrosion resistant metal material, said body being of a thickness and the line of weakness in the annular section being of a depth such that in correlation with the thickness of the body, the central region of the disc will rupture along said line of weakness at a pressure no greater than about 100 psig on the convex faces of the bulges.

10. In a rupture disc as set forth in claim 1, wherein said disc body is fabricated of a corrosion resistant metal material, and the line of weakness in the annular section is of a depth such that in correlation with the thickness of the body, the central region of the disc will resist rupture along said line of weakness at a pressure up to about 90% of the burst pressure of the disc.

11. In a rupture disc assembly for sanitary applications requiring repeated easy disassembly and cleaning thereof for protecting a pressurized system under relatively low pressure, the improvement comprising:

a tubular fixed vent member for connection to the system and defining a vent passage therethrough adapted for direct communication with the system, said fixed vent member being provided with a flange directed outwardly from the passage through the vent member;

a tubular removable vent member having an exhaust passage and provided with a flange which complementally mates with the flange of the fixed vent member;

a quick release clamp structure engageable with the mating flanges of the fixed and removable vent members for releasably securing the removable vent member to the fixed vent member;

a scored rupture disc having a non-apertured disc body provided with a generally circular, central region, an outer relatively flat annular section having an inner edge surrounding and joined to the central region and an arcuate line of weakness in the annular section in generally circumscribing relationship to the central region except for a non-scored hinge portion, and wherein the central region is divided into separate, side-by-side, semi-circular, concavo-convex bulges extending outwardly in a first direction from the annular section of the body, said disc further having a diametrical ridge extending across the central region of the disc body between opposed portions of the inner edge of the annular section thereof and dividing the region into said separate bulges, said diametrical ridge having an outer margin spaced outwardly from a plane through the adjacent face of the annular section of the disc body presenting upright end segments at each end of the ridge, the distance between said outer margin of the ridge and said plane through the annular section of the disc body in a direction perpendicular to said plane being from about 0.3% to about 3% of the diameter of said central region of the body; and a one piece gasket mounted on the disc and provided with annular segments engaging opposed faces of the annular section of the disc in circumscribing relationship to the central region of the disc, said disc and gasket thereon being removably mounted between the flanges of the fixed vent member and the removable vent member and held in position therebetween by the quick release clamp structure.

12. In a rupture disc as set forth in claim 11, wherein the distance between said outer margin of the ridge and said plane through the annular section of the disc body in a direction perpendicular to said plane being from about 0.75% to about 1.5% of the diameter of said central region of the body.

13. In a rupture disc as set forth in claim 11, wherein the distance between said outer margin of the ridge and said plane through the annular section of the disc body in a direction perpendicular to said plane being from about 1% to about 1.25% of the diameter of said central region of the body.

14. In a rupture disc as set forth in claim 11, wherein the quick release clamp structure includes a pair of hingedly interconnected arms, each of said arms being provided with a concave groove therein for receiving an edge portion of the gasket therein, and a manually manipulable fastener for releasably interconnecting the free ends of the arms remote from the hinge connection therebetween.

15. In a rupture disc assembly for protecting a pressurized system under relatively low pressure, the improvement comprises:

a tubular fixed vent member for connection to the system and defining a vent passage therethrough adapted for direct communication with the system, said fixed vent member being provided with a flange directed outwardly from the passage through the vent member;

a tubular removable vent member having an exhaust passage and provided with a flange which complementally mates with the flange of the fixed vent member; and a scored rupture disc having a non-apertured disc body provided with a generally circular, central region, an outer relatively flat annular section having an inner edge surrounding and joined to the central region and an arcuate line of weakness in the annular section in generally circumscribing relationship to the central region except for a non-scored hinge portion, and wherein the central region is divided into separate, side-by-side, semi-circular, concavo-convex bulges extending outwardly in one direction from the annular section of the body, said disc further having a diametrical ridge extending across the central region of the disc body between opposed portions of the inner edge of the annular section thereof and dividing the region into said separate bulges, said diametrical ridge having an outer margin spaced outwardly from a plane through the adjacent face of the annular section of the disc body in a direction opposite said one direction, the distance between said outer margin of the ridge and said plane through the annular section of the disc body in a direction perpendicular to said plane being from about 0.3% to about 3% of the diameter of said central region of the body, and the longitudinal length of the ridge being at least equal to about 70% of the diameter of said vent member passage.

16. In a rupture disc assembly as set forth in claim 15, wherein the longitudinal length of the ridge is in the range of about 70% to about 97% of the diameter of said vent member passage.

* * * * *